D. C. PRATT.
LOCK NUT.
APPLICATION FILED OCT. 25, 1916.
1,268,149. Patented June 4, 1918.
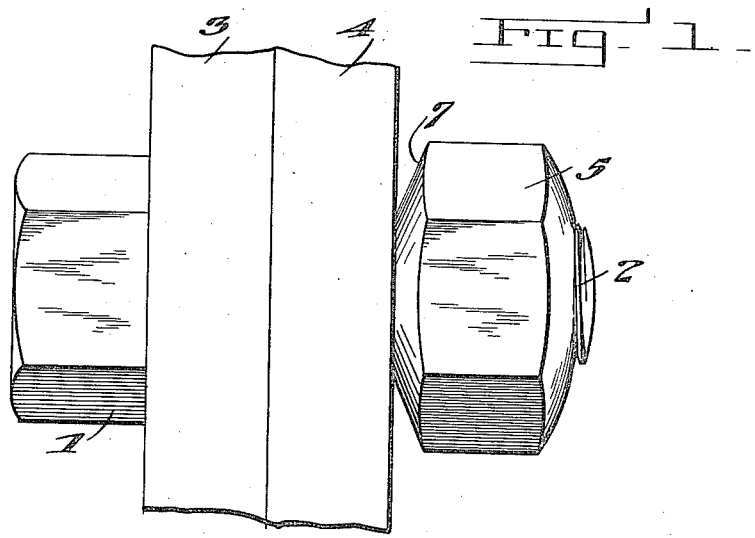
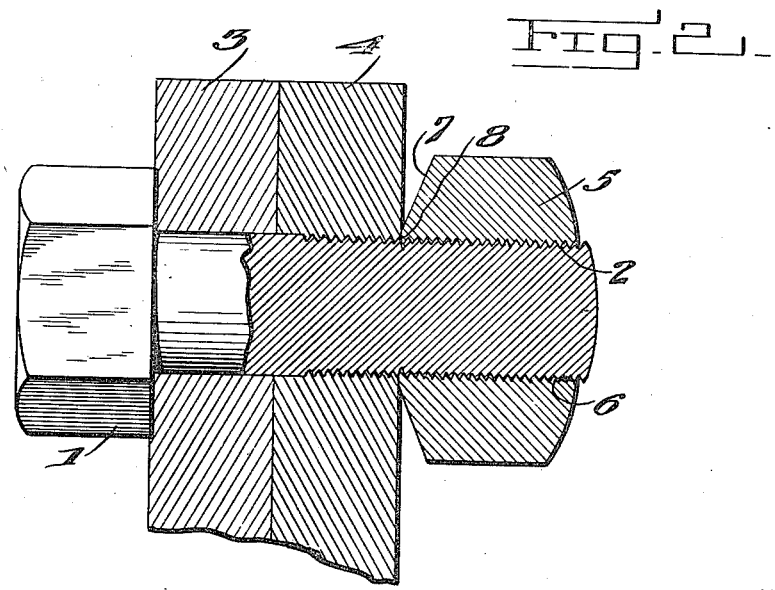

UNITED STATES PATENT OFFICE.

DUANE C. PRATT, OF EDGERTON, WISCONSIN.

LOCK-NUT.

1,268,149.  Specification of Letters Patent.  Patented June 4, 1918.

Application filed October 25, 1916. Serial No. 127,662.

*To all whom it may concern:*

Be it known that I, DUANE C. PRATT, a citizen of the United States, residing at Edgerton, in the county of Rock and State of Wisconsin, have invented certain new and useful Improvements in Lock-Nuts, of which the following is a specification.

This invention relates to an improvement in lock nuts and more particularly to a device of this character which is so constructed that it may be applied to and used upon bolts or other threaded parts indiscriminately of whether the same may have been particularly constructed to mate with the nut.

An object of my invention is to provide a nut of the character described which is so constructed that it may be used in securing wooden, metal, or other parts together and which will have an equally efficient holding and gripping action in any connection in which it may be applied.

With the above and other objects in view, my invention consists in certain novel features of construction and formation which will be hereinafter set forth in connection with the drawings and then more particularly pointed out in the claim.

In the drawings:—

Figure 1 is a fragmentary elevational view showing the device of my invention applied and in use.

Fig. 2 is a view similar to Fig. 1 showing portions of the structure sectioned to more clearly illustrate the exact form and manner of application.

In the present illustration, the bolt 1 is illustrated as being of substantially standard form and the end of the shank away from the head is externally screw threaded as shown at 2, these threads being of standard or of any special or desired pitch and configuration. The members 3 and 4, which are here illustrated as secured together by bolts, are only shown to give a better understanding of the exact manner of application of the lock nut, and these parts might be wood, metal, or any other material and the device will operate with equal efficiency.

The nut proper comprises the blank 5 which in the present instance is shown as being hexagonal, and this blank has a central orifice 6 which is threaded to be screwed onto the threaded end of the bolt shank. The inner side of the nut is turned down or otherwise shaped to present a substantially truncated cone shape as shown at 7, and thus a more or less sharp rim edge is provided around the central orifice 6 of the nut, the angle of this cutting or biting edge 8 being determined by the pitch given to the conical wall or face 7.

In the use of the nut constituting my invention, the same is applied upon a bolt, or other threaded portion with the face 7 disposed inwardly and as the edge 8 comes to bear against the portion which is to be secured, and which in the present instance is the member 4, this edge 8 is first to come to the bearing engagement and consequently has the greatest strain placed thereon so that if the part 4 be metal, this edge 8 will cut into the same to a certain degree and will thus wedge while at the same time being somewhat compressed and brought to a tighter fit against the threads of the bolt. If the part 4 be of wood or other compressible material, then the edge 8 will be sunk into the same and the face 7 will thus wedge against the material, and in this way a very secure holding action is accomplished.

While, in the foregoing, I have set forth the lock nut as being constructed to have a particular form, it will of course be understood that the blank might be made to any other desired and suitable configuration than that mentioned, that the thread can be varied to adapt the nut to fit the particular part on which it is to be used, and that the pitch and angle of the face 7 can be changed to thus suit the requirements in use, and thus while I have shown only one particular form and one particular adaptation, I do not wish to be limited to the exact disclosure but rather only to such points as may be set forth in the claim.

I claim:

A lock nut comprising a blank shaped to the desired form and provided with a central screw-threaded opening, said blank being shaped on its inner bearing face to have a substantially truncated cone shape in which a gradual slope is given from a comparatively sharp edge around the screw-threaded central opening to the peripheral edge of the blank.

In testimony whereof I affix my signature in presence of two witnesses.

DUANE C. PRATT.

Witnesses:
 RUTH LACKNER,
 C. A. HOEN.